United States Patent [19]
Marlow

[11] 3,966,225
[45] June 29, 1976

[54] INFLATING DEVICE WITH SELF-CONTAINED PROPELLANT GAS GENERATING CARTRIDGE

[75] Inventor: Darrell W. Marlow, Herrin, Ill.

[73] Assignee: Olin Corporation, New Haven, Conn.

[22] Filed: Oct. 11, 1973

[21] Appl. No.: 405,359

Related U.S. Application Data

[63] Continuation-in-part of Ser. No. 286,361, Sept. 5, 1972.

[52] U.S. Cl. .................. 280/737; 222/5; 60/254
[51] Int. Cl.² ......................... B60R 21/08
[58] Field of Search ............ 280/150 AB; 222/3, 5; 60/254, 253, 255; 102/39; 9/316

[56] References Cited
UNITED STATES PATENTS

| | | | |
|---|---|---|---|
| 2,959,326 | 11/1960 | Pouliot | 222/5 |
| 2,979,896 | 4/1961 | Perkins et al. | 102/39 X |
| 3,073,112 | 1/1963 | Bleikamp | 60/254 X |
| 3,167,912 | 2/1965 | Ledwith | 60/254 X |
| 3,642,304 | 2/1972 | Johnson et al. | 280/150 AB |
| 3,663,036 | 5/1972 | Johnson | 222/5 |
| 3,758,131 | 9/1973 | Stephenson et al. | 280/150 AB |
| 3,788,667 | 1/1974 | Vancil | 280/150 AB |
| 3,856,181 | 12/1974 | Merrell | 280/150 AB |
| 3,865,273 | 11/1975 | Zeigler | 280/150 AB |

*Primary Examiner*—Kenneth H. Betts
*Attorney, Agent, or Firm*—Donald R. Motsko

[57] ABSTRACT

A self-contained propellant gas generating cartridge for use in connection with safety systems utilizing inflatable confinements. The cartridge has a tubular body portion housing a propellant charge, a head portion at one end of the body portion in which is mounted an ignitor for the propellant charge, and a nozzle member closing the other end of the body portion. In one embodiment the tubular body and head portion may be metallic while in another embodiment they may be plastic. The cartridge may also include means to reduce the effective throat area of the nozzle when a fast deployment of the system is desired.

4 Claims, 8 Drawing Figures

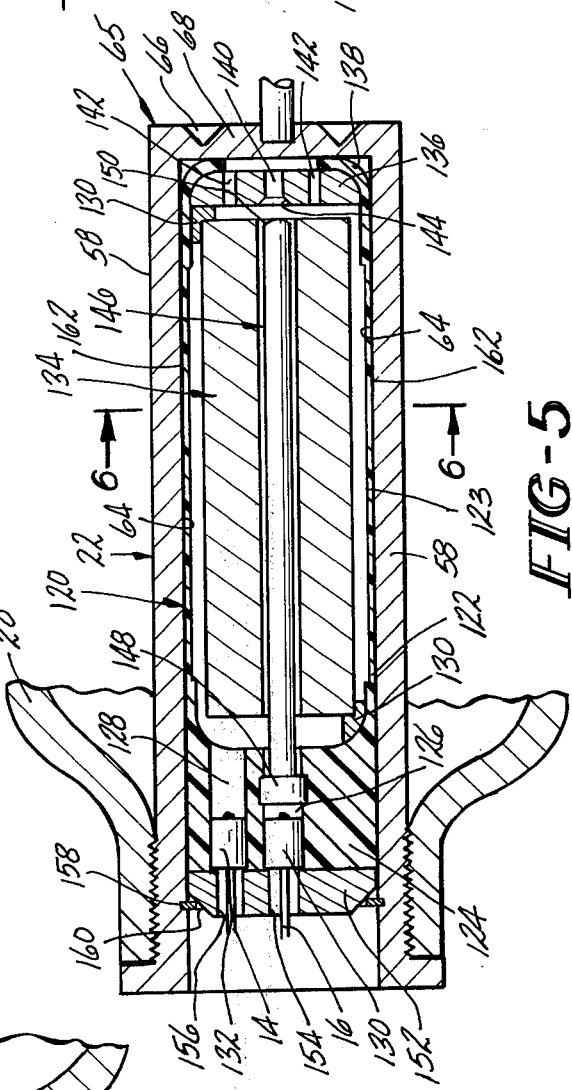
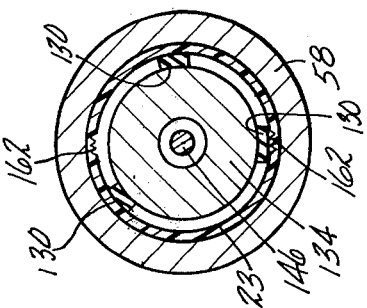
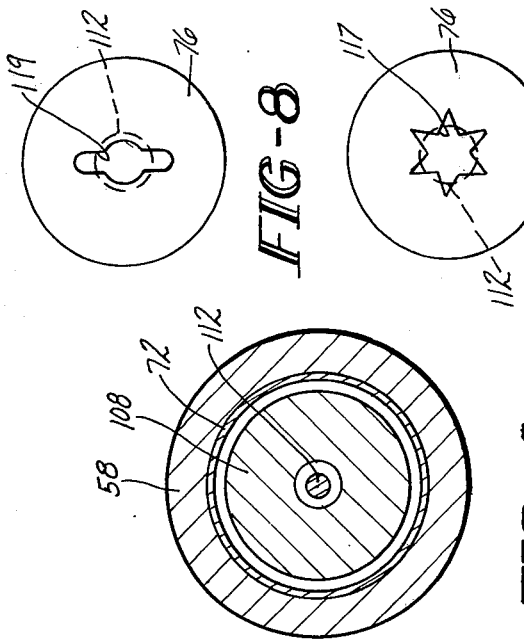
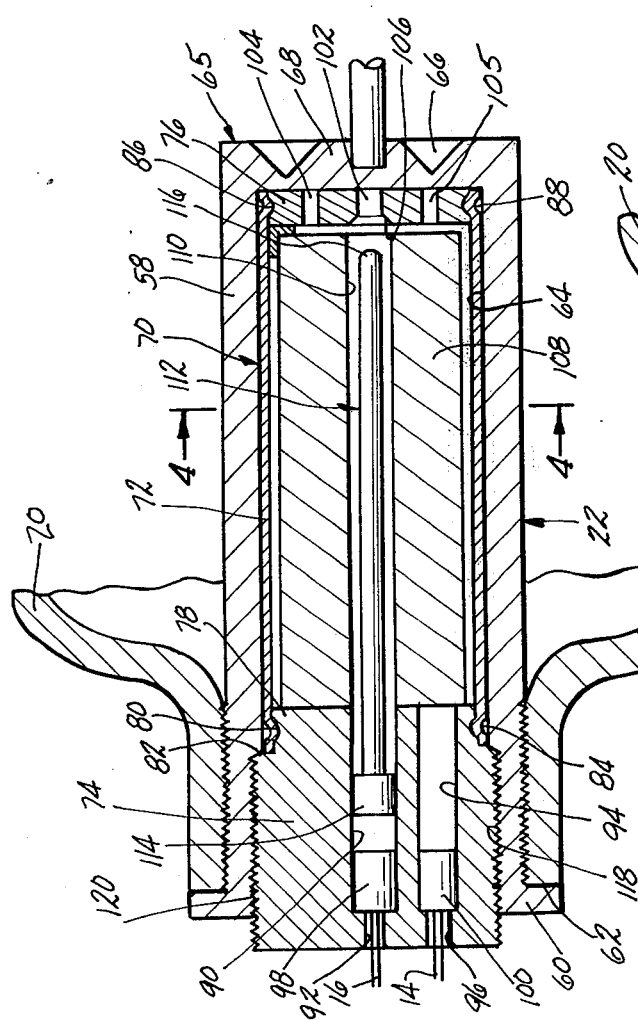

INFLATING DEVICE WITH SELF-CONTAINED PROPELLANT GAS GENERATING CARTRIDGE

CROSS-REFERENCE TO RELATED APPLICATION

This application is a continuation in part of my co-pending application Ser. No. 286,361 filed Sept. 5, 1972 entitled "Inflating Device for use with Vehicle Safety Systems."

BACKGROUND OF THE INVENTION

The present invention relates generally to the field of vehicle safety systems of the type utilizing an inflatable confinement. More particularly, this invention relates to a cartridge and cartridge receiving chamber for use in such systems.

A great deal of effort is being given to the problem of increasing the safety of passenger vehicles. As well as trying to increase the safety of the vehicle itself, considerable effort is being given to the development of passive restraint systems which will protect the occupant of the vehicle from injury due to impact without the necessity of the occupant taking any positive action.

One type of passive restraint system which has been developed utilizes an inflatable confinement such as a bag which is automatically inflated in response to a predetermined condition such as an impact to or the upsetting of the vehicle to protect the occupant from contacting the interior of the vehicle and injuring himself.

The present invention is concerned with a vehicle safety system which utilizes a propellant charge for the generation of hot gas. The hot gas from the propellant charge can be the sole source of inflating the confinement, can be used with ambient air, or, in accordance with the preferred embodiment, used to augment a stored fluid.

Prior to the present invention, systems of this type utilized a propellant storage chamber in which would be placed a nozzle, a metallic sleeve, a separate propellant charge inside the sleeve, and a closure member in which the ignitor is mounted. The closure member normally would be threaded into the storage chamber. In the case of an augmented system wherein a fluid reservoir is used for storing a gas, the propellant storage chamber is operably connected to the reservoir. In the usual course of operation, the reservoir and cartridge chamber would be constructed, the reservoir filled with the appropriate fluid under pressure, and the components including the propellant charge mounted in the propellant storage chamber at the suppliers location. The entire unit must then be shipped to where it can be installed in the vehicle.

Due to shipping regulations because of the propellant charge, the inflator unit must be equipped with a shipping cap for safety purposes. The necessity of a shipping cap adds to the expense of the unit as well as requiring additional manufacturing and assembling steps.

SUMMARY OF THE INVENTION

The present invention has for its object the provision of a propellant gas generating cartridge for use in a specially designed cartridge receiving chamber of a gas generator for inflatable safety systems.

By making the propellant gas generating cartridge self-contained in an insertable form, the inflating unit, minus the propellant charge, can be shipped more easily and less expensively to the location where it is installed in the vehicle. The propellant gas generating cartridge can be shipped according to the prevailing shipping regulations at a lesser cost than if the whole unit including the propellant charge and shipping cap had to be shipped.

Another object of the present invention is the provision of a propellant gas generating cartridge for the production of propellant gas for use in vehicle safety systems wherein the cartridge is a self-contained unit having means whereby the gas can be generated at either a relatively slow rate or relatively fast rate depending upon the type of desired speed of deployment of the confinement.

In accordance with the present invention, a self-contained propellant gas generating cartridge is constructed having a tubular body portion, a head portion closing one end of said body portion, and a nozzle member closing the other end of the body portion. A propellant charge is located within the tubular body portion. Means for igniting the propellant charge is located in the head portion.

The cartridge may also include means to generate the gas at a low level for slow deployment of the system and at a high level for fast deployment of the system. This includes means mounted in the cartridge for reducing the effective throat area of the nozzle when fast or rapid deployment of the system is desired.

BRIEF DESCRIPTION OF THE DRAWINGS

FIG. 3 is an enlarged cross-sectional view showing one embodiment of a propellant gas generating cartridge and the cartridge receiving chamber in which it is received which can be used in the inflating unit of FIG. 2;

FIG. 4 is a transverse cross-sectional view taken along the lines 4—4 of FIG. 3;

FIG. 5 is an enlarged cross-sectional view of a second embodiment of a gas generating cartridge and the cartridge receiving chamber in which it is received which can be used in the inflating unit of FIG. 2;

FIG. 6 is a transverse cross-sectional view taken along the lines 6—6 of FIG. 5;

FIG. 7 is an end view of an alternate embodiment showing an alternate orifice configuration;

FIG. 8 is an end view of another alternate embodiment showing another orifice configuration.

DETAILED DESCRIPTION

Figures 1, 2:
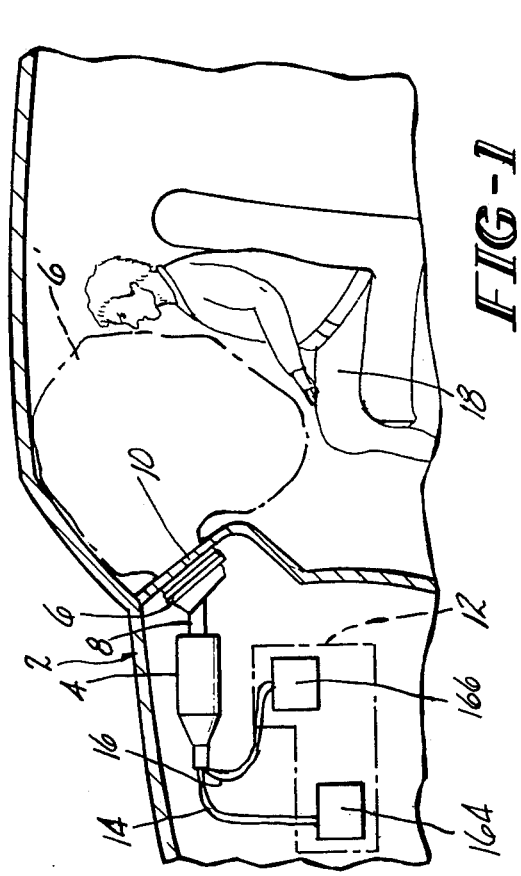
FIG. 1 is a partially broken away, fragmentary, side view of a vehicle equipped with a safety device incorporating the present invention and showing one arrangement of such a system in the vehicle.
FIG. 2 is a partial cross-sectional view of the inflating unit incorporating the present invention.

Referring to the drawings, and in particular FIG. 1, a system incorporating the present invention is shown mounted in a vehicle 2. The system includes an inflating unit 4 connected to an inflatable confinement 6 by means of a manifold 8. The confinement 6 in the example shown, is mounted in the dashboard 10 of the vehicle 2 in its deflated or collapsed storage position. The confinement 6 may be in the form of a flexible bag of rubber, cloth, or the like and may be vented in any known manner or may be non-vented if desired.

Collision sensing means 12 is attached to the vehicle 2 and is connected to the inflator 4 by suitable electrical connectors 14 and 16. The sensing means 12 are of the type which will produce an electric current when the vehicle is involved in a collision of a predetermined magnitude. As explained in more detail below, electrical leads 14 will carry a current from the sensing means 12 in response to a low level crash when slow deployment of the system is desired, while both leads 14 and 16 carry an electric current when the vehicle is involved in a high speed crash and fast deployment of the system is required. The electric current from the sensing means 12 serves to actuate the inflator 4 which in turn inflates the confinement 6 into its expanded condition as indicated at 6' to provide a cushion against which the occupant 18 of the vehicle 2 will impact.

The inflating unit 4 which is shown in greater detail in FIG. 2, comprises a fluid storage reservoir 20 in the shape of an elongated bottle fabricated from a high strength material such as steel, aluminum, or the like. The forward, or left hand end as viewed in FIG. 2 is reduced to the bottle like shape and is closed by a cartridge receiving chamber 22. The rearward end is closed by an integral portion of the reservoir 20 and includes an outlet portion 24. The outlet portion 24 of the reservoir 20 includes a rearward extension portion 26 formed integrally with the remainder of the reservoir 20. A recess or bore 28 extends rearwardly in the outlet portion 24 with its open end communicating with the interior of the reservoir 20. The bore 28 is separated from a bore 30 in the rearward end of the extension portion 26 by a web 32. The web 32 is provided with a circular groove 34 which forms a rupturable closure portion 36 closing the interior of the reservoir 30 from the manifold 8 and the inflatable confinement 6.

The bore 30 in the outlet portion 24 of the reservoir 20 has its open end closed by a plug 38 threadedly secured thereto. The walls defining the bore 30 have a plurality of apertures 40 therein, each aperture having an axis substantially perpendicular to the axis of the bore 30. The apertures 40 serve to diffuse the exiting gases and are so dimensioned as to prevent the rupturable closure portion 36 from passing through the manifold 8 in the confinement 6 after it has broken loose from the web 32.

The manifold 8 is connected to the outlet 24 by means of an internally threaded portion 42 being connected to the threaded portion 44 of the rearward extension 26.

A rod member 46 extends from the inner end of the cartridge receiving chamber 22 to the bore 28 and terminates at a point slightly spaced from the rupturable closure portion 36. The rod member 46 has its forward end 48 received within a bore 50 in the end of the cartridge receiving chamber 22. The other end portion 52 of the rod member 46 is supported adjacent its free end by a deflecting member 54 which has a plurality of apertures 56 therein, the axis of which are perpendicular to the axis of the outlet portion 24.

The interior of the reservoir 20 is adapted to contain a non-toxic fluid under pressure. Such fluid may be nitrogen, argon, helium, oxygen, or other suitable fluids or mixtures thereof.

The cartridge receiving chamber 22 as shown in detail in FIG. 3, includes a generally cylindrical housing member 58 which is threadedly secured to the reduced end of the reservoir 20. A flange 60 on the housing member 58 abuts against the end face 62 of the reduced portion of the reservoir 20. The housing includes a bore 64 extending inwardly from its outer end to a closed inner end 65. The outer surface of the inner end 65 is provided with a circular groove 66 therein which forms a rupturable closure portion 68 designed to break loose from the remainder of the web when subjected to a predetermined pressure.

In the embodiments shown in FIGS. 3 and 4, the self-contained propellant gas generating cartridge 70 includes a metallic tubular body portion 72, a metallic head portion 74, and a nozzle member 76. The head portion 74 includes an inner reduced portion 78 having a groove 80 therein. The reduced portion 78 forms a shoulder 82. One end of the tubular body portion 72 is inserted over the reduced portion 78 of the head portion 74 and crimped into the circular groove 80 as indicated at 84 to provide a positive connection. The nozzle member 76 also includes a circular groove 86 about its periphery and the other end of the tubular body member 72 is crimped into the groove as indicated at 88.

The head portion 74 includes a first bore 90 therein coaxial with the axis of the cartridge 70 and opening to the inside of the cartridge 70. A reduced bore 92, coaxial with bore 90, provides communication between bore 90 and the outside of the cartridge. Another bore 94 is provided in the head portion 74 having an axis parallel to but spaced from the axis of bore 90. The bore 94 opens to the inside of the cartridge 70. A reduced bore 96 provides communication between bore 94 and the outside of the cartridge.

Suitable ignitor members 98 and 100 are mounted in the bores 90 and 94 respectively. The leads 14 and 16 extend through the reduced bores 96 and 92 respectively, which may be sealed by any suitable material such as an epoxy resin.

The nozzle member 76 is provided with one or more orifices designated 102, 104 and 105. Orifice 102 is coaxial with the bore 90 and is provided with a slight taper 106 at its opening.

A suitable propellant charge 108 is mounted in the tubular body portion 72 of the cartridge 70 between the head portion 74 and the nozzle 76. The propellant charge 108 may be of any suitable type capable of generating a hot non-toxic gas when ignited and mixed with fluid in the reservoir 20. In this case, the propellant charge comprises a cylindrical grain having a bore 110 extending axially therethrough in alignment with the axis of bore 90.

A rod member 112 includes an enlarged head portion 114 frictionally received within the bore 90 in the head portion 74. The rod member 112 extends from the head portion 74 to a point rearwardly of the orifice 102. The end of the rod member adjacent orifice 102 may be provided with a taper 116 to mate with the taper 106 of orifice 102.

In the case where only one orifice is provided in the nozzle 76, the area of the orifice is larger than the rod diameter and therefore the rod does not close off the orifice completely but merely reduces the effective area of the orifice. As shown in FIG. 7, the single orifice 117 could be star shaped with the diameter of the rod member 112 being greater than the diameter of the imaginary circle in which the inner points lie and less than the diameter of the imaginary circle in which the outer points lie. Alternatively, as shown in FIG. 8, a single orifice 119 may be circular with two or more lobes. The diameter of the rod member would have a diameter slightly larger than the circular portion of the orifice 119.

The cartridge receiving chamber 22 is provided with a threaded counter bore 118 at its outer end to receive the threaded enlarged portion 120 of the head portion 74.

As the propellant cartridge 70 is a self-contained unit, it can be handled separately from the inflating unit 4. When it is desired to assemble the entire system, all that is necessary is that the cartridge be threaded into the bore 64 in the cartridge receiving chamber 22 until the shoulder 82 of the head portion 74 abuts the bottom of the threaded counterbore 118.

In accordance with the embodiment shown in FIGS. 5 and 6, the propellant gas generating cartridge 120 shown therein comprises a one-piece plastic cartridge case 122 having a tubular body portion 123 and a thickened base portion 124. While various plastic materials may be used, the preferred material is polyethylene. The base portion 124 of the cartridge 120 is provided with a bore 126 which is coaxial with the axis of the cartridge 120. A second bore 128 is also provided in the base 124 having an axis parallel to but spaced from the axis of the bore 126. Ignitor members 130 and 132 are mounted in the bores 126 and 128 respectively, and are frictionally retained therein.

A suitable propellant charge 134, similar to the propellant charge 108 of the previously described embodiment, is mounted within the tubular body portion 123 of the cartridge case 122. Suitable resilient mounts 130 may be provided at each end of the propellant charge 134 to hold it in place. The forward end of the cartridge 120 is provided with a nozzle 136 which abuts against the front support 130 with the end of the tubular body portion 123 being crimped over the outside thereof as indicated at 138 to hold the nozzle member in place. As in the previous embodiment, the nozzle member 136 is provided with one or more orifices 140 and 142 being shown, with orifice 140 being coaxial with the bore 126. Orifice 140 may be provided with a slight taper 144 at its opening. A single orifice such as shown in either FIG. 7 or 8 and described above may also be used.

A rod member 146 has an enlarged head portion 148 frictionally retained within the bore 126. The rod member 146 extends from the base portion 124 to a point slightly spaced from orifice 140. The end of the rod member 146 adjacent orifice 140 may be provided with a slight taper 150 to mate with the taper 144 of the orifice 140.

The base of the cartridge 120 may be provided with a metallic disc 152 which may be attached thereto by any suitable means such as bonding by an adhesive. The disc 150 is provided with two bores 154 and 156 coaxial with bores 126 and 128 respectively in the base 124 of the cartridge 120. The bores 154 and 156 are of smaller diameter than the bores 126 and 128. The leads 14 and 16 extend from the ignitor members 132 and 130 through the bores 156 and 154 to the outside of the cartridge.

To mount the cartridge 120 in the cartridge receiving chamber 22, the bore 64 thereof is provided with a groove 158. The cartridge member is inserted in the cartridge receiving chamber 22 and a snap ring 160 placed in the groove 158 bearing against the metallic disc 152 to hold the cartridge 120 in place.

The elasticity of the plastic cartridge case 122 permits the metallic disc 152 and snap ring 160 to be preloaded. This prevents dynamic loading at propellant ignition which would create extensive stress on the metallic disc 152 and snap ring 160. The plastic case 122 of the cartridge 120, because of its inherent elasticity, acts as a comprehensive gas seal, sealing in all locations. When the cartridge is pressurized during operation the nozzle member 136 bears against the plastic case crimp 138 which because of its' elasticity provides a gas seal. Similarly, because of the elasticity of the plastic case, the tubular body portion 123 of the cartridge case 122 when pressurized during operation expands outward against the inside wall 64 of the cartridge receiving chamber 22 to prevent gas flow outside of the case. During operation gas is prevented from escaping past the ignitors 130 and 132 by the force of the base portion of the cartridge 134 bearing against the metallic disc 152, which because of the elasticity of the plastic case, causes the plastic to bear compressively against the ignitor members 130 and 132 and seal against gas flow outside of the cartridge.

Another advantage of the plastic cartridge case when the cartridge is outside of the cartridge receiving chamber is that no pressure is generated and no thrust occurs in the event that the cartridge 120 is in a fire. Normally, a gas generator incased in a housing exhibits thrust as the propellant ignites and pressurizes the housing chamber thereby becoming a projectile or discharging shrapnel. In the present case, if the cartridge 120 were placed in a fire, the plastic softens and melts and eventually is ignited as is the propellant charge 134. Because of the softened and partially burned condition of the plastic case, it cannot withstand internal pressure and does not allow the pressure to build up in the case. In essence, the plastic melts around the propellant grain and offers no resistance to gas generated by the propellant when it ignites. Therefore, no pressure is generated and no thrust occurs.

If desired, the wall of the tubular portion 122 of the cartridge may be provided with means to vent ignition gas at low pressure. The internal wall of the tubular portion 122 is provided with two diametrically opposed sets of one or more longitudinally extending V-grooves 162. In the event that the ignitor is inadvertently ignited during shipping and handling prior to installation in the inflator, the tubular portion will rupture at the V-grooves 162 and serve to prevent grain ignition. The gas generated by the ignitor is vented precluding pressure built up inside the plastic case and therefor preventing ignition of the propellant grain. Under these circumstances, no missiles are ejected, the gas generator case remains in tact, no thrust is generated and the propellant charge does not burn.

As stated above, the cartridge of both embodiments are designed to be used in systems having both slow or low level and fast or high level deployment. In the case of a vehicle, low level deployment may be used in connection with those crashes occuring when the vehicle is traveling at low rates of speed and high level deployment can be used in connection with those crashes occuring when the vehicle is traveling at high rates of speed. Depending upon a particular vehicle and parameters, low level deployment might be used during vehicle speeds of 15 to 20 miles per hour while high level deployment would be used for vehicle speeds over 20 miles per hour.

The sensing means used to ignite the various ignitor members 98, 100, 130 and 132 may consist of two separate sensors 164 and 166. Sensor 164 should be designed to sense low level collisions while sensor 166 should be designed to sense high level collisions. Obviously, in the case of high level collisions, sensor 164 will also be actuated. Such sensing devices may be an accelerometer, inertia responsive switch, or other devices known in the art. It is contemplated that other sensing means may be used such as a single sensor which would only actuate the low level circuit including lead 14 at a low level crash, but would actuate both electric circuits including leads 14 and 16 at a high level crash.

In the embodiment shown in FIGS. 3 and 4, when a low speed crash is sensed, ignitor 100 will be fired by means of an electric current passing through lead 14. The firing of ignitor 100 causes the ignition of the propellant charge 108. The ignition of propellant charge and pressurization of the propellant chamber inside the cartridge case 70 causes the rupture of the rupturable closure disc 68 and causes the rod 46 to move to the right as viewed in FIG. 2 where it impacts upon the rupturable closure portion 36 to cause the rupture thereof. The hot propellant gas generated by the burning of the propellant charge 108 flows through the nozzle 76 into the interior of the reservoir 20 and mixes with the stored fluid therein. The mixture of hot gas and stored fluid flows out the outlet 24 through the apertures 40, through manifold 8 to the confinement 6 and causes the inflation thereof.

The pressure in the propellant chamber in the cartridge 70 during the burning of the propellant charge 108 therein controls the rate of burning of the propellant charge. The effective throat area of the orifices in the nozzle 76 should be so designed that the propellant charge 108 burns at a relatively low pressure and therefor at a relatively slow rate so that the confinement 6 is deployed in a relatively slow manner during low level deployment of the system.

In the event of a high speed crash and fast deployment of the system is desired, ignitor 98 as well as ignitor 100 is fired by means of electrical currents being passed through electrical leads 14 and 16 from the sensing means 12. The ignitor member 100 functions in the manner as set forth above and serves to ignite propellant charge 108. The firing of the ignitor member 98 forces the rod member 112 to the right as viewed in FIG. 3 and closes orifice 102 of the nozzle member 76. This in effect decreases the effective throat area of the nozzle 76 and causes an increase in propellant chamber pressure and an increase in the burning rate of the propellant charge 108. Due to the faster burning rate of the propellant charge 108 at the higher pressure, the confinement 6 will be inflated at a faster rate. If only one orifice is provided in the nozzle, such as shown in FIGS. 7 and 8, the rod member 112 will close only a portion of the orifice. This has the same effect as completely closing one orifice of a multi-orifice nozzle and will cause an increase in the propellant chamber pressure and an increase in the burning rate of the propellant charge 108.

The operation of the embodiment shown in FIGS. 5 and 6 is substantially the same as that of the previously described embodiment. When ignitor 132 is fired during low level deployment, the propellant charge 134 will be ignited and burn causing the rupture of the rupturable closure portion 68 as well as causing the rod member 46 to move and rupture rupturable closure portion 36. The gas generated from the burning of the propellant charge 134 will pass through the nozzle 136 into the interior of the reservoir 20. The mixture of the hot gas and stored fluid will pass through the outlet 26 and flow to the confinement 6 to cause the inflation thereof.

In the event of a high level crash when high level deployment of the system is desired, both ignitor members 130 and 132 will be fired. The ignitor member 132 will serve to ignite the propellant charge 134 while ignitor member 130 will force the rod member 146 to the right as viewed in FIG. 5 and close orifice 140 of the nozzle member 136. This results in a decrease in the effective throat area of the nozzle 136 resulting in a high pressure in the propellant chamber in the cartridge 120 and faster burning of the propellant charge 134 and thus a more rapid deployment of the confinement 6. When only one orifice is provided in the nozzle 136, such as shown in FIGS. 7 and 8, the rod member 146 will only close a portion of the orifice with the same effect as completely closing one orifice of a multi-orifice nozzle.

In the event that only one level of operation is desired, the cartridges 70 and 120 could be modified to eliminate one of the ignitor members and the rod member 112 and 146. In such a case, the cartridges would still have the advantage of being a self-contained unit which can be shipped separate from the inflator and can be easily inserted at the point of assembly to provide a complete and operable unit.

What is claimed is:

1. In an inflating device for use in connection with vehicle safety systems of the type including an inflatable confinement, a reservoir for storing a fluid under pressure, a cartridge receiving chamber extending into said reservoir and having an external opening at its outer end, means at the other end of said chamber sealing said chamber from said reservoir and operable upon a predetermined pressure to provide communication between said reservoir and chamber, a self-contained propellant gas generating cartridge secured within said chamber, said cartridge comprising an elongated tubular body portion formed integral with a head portion, said head portion and body portion formed from a resilient plastic material, a propellant charge positioned within said tubular body portion between said head portion and the other end, ignitor means positioned within said head portion for igniting said propellant charge, a nozzle member closing said other end of the cartridge adjacent the means sealing said chamber, said nozzle being held in place by folding over a portion of said body portion, means for reducing the throat area of said nozzle positioned within said cartridge, and means locking said cartridge within said chamber under a predetermined load.

2. In the inflating device of claim 1, said locking means comprising a disc attached to the end of the head portion, a groove in the bore of said chamber, and a snap ring in said groove bearing against said disc and holding said cartridge in a preloaded condition.

3. The cartridge of claim 1 further including means for venting ignition gas at low pressure if said ignitor means is ignited when the cartridge is not contained in a cartridge receiving chamber.

4. The cartridge of claim 3 wherein said means for venting ignition gas includes two diametrically opposed sets of one or more longitudinally extending V-grooves in the tubular body portion.

* * * * *